United States Patent
Takeda

(10) Patent No.: US 8,462,600 B2
(45) Date of Patent: Jun. 11, 2013

(54) OPTICAL DISC DEVICE

(75) Inventor: Futoshi Takeda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/472,784

(22) Filed: May 16, 2012

(65) Prior Publication Data

US 2012/0294134 A1 Nov. 22, 2012

(30) Foreign Application Priority Data

May 20, 2011 (JP) ................................. 2011-113451

(51) Int. Cl.
*G11B 7/00* (2006.01)
(52) U.S. Cl.
USPC ....................................................... 369/53.23
(58) Field of Classification Search
None
See application file for complete search history.

(56) References Cited

U.S. PATENT DOCUMENTS

| | | | | |
|---|---|---|---|---|
| 5,088,078 A * | 2/1992 | Moriwaki et al. | ......... | 369/44.25 |
| 5,790,493 A | 8/1998 | Takeya et al. | | |
| 6,490,237 B1 * | 12/2002 | Supino | ......................... | 369/59.1 |
| 7,830,761 B2 * | 11/2010 | Kayama et al. | ............ | 369/47.15 |
| 7,852,715 B2 * | 12/2010 | Hosokawa et al. | ......... | 369/44.27 |
| 7,936,654 B2 * | 5/2011 | Yoshimoto | .................. | 369/53.22 |
| 2002/0114231 A1 * | 8/2002 | Shirakawa et al. | ......... | 369/44.32 |
| 2005/0030867 A1 * | 2/2005 | Choi et al. | .................. | 369/53.23 |
| 2006/0028973 A1 * | 2/2006 | Shoji et al. | .................. | 369/275.1 |
| 2006/0256672 A1 * | 11/2006 | Suzuki | ........................ | 369/44.28 |
| 2009/0034399 A1 * | 2/2009 | Hosokawa et al. | ....... | 369/112.23 |
| 2012/0294129 A1 * | 11/2012 | Eiza | ............................ | 369/44.32 |
| 2012/0294134 A1 * | 11/2012 | Takeda | ......................... | 369/100 |

FOREIGN PATENT DOCUMENTS

| | | |
|---|---|---|
| JP | 09-106617 | 4/1997 |
| JP | 3890709 | 12/2006 |
| JP | 2009-054229 | 3/2009 |

* cited by examiner

*Primary Examiner* — Peter Vincent Agustin
(74) *Attorney, Agent, or Firm* — Morgan, Lewis & Bockius LLP

(57) ABSTRACT

Even when a first differentiation value is equal to or greater than a first threshold value, this optical disc device does not confirm "CD" to be the differentiation result, as long as a first focus error signal FE1 or a first focus sum signal FS1 is less than a second threshold value; and even when the first differentiation value is equal to or greater than a second differentiation value, this optical disc device does not confirm "CD" to be the differentiation result, as long as the signal FE1 is less than a second focus error signal FE2, or as long as the signal FS1 is less than a second focus sum signal FS2. The signals FE1 and FS1 are obtained when a CD laser beam is directed onto an optical disc. The signals FE2 and FS2 are obtained when a DVD laser beam is directed onto the disc.

8 Claims, 8 Drawing Sheets

OPTICAL DISC DEVICE

This nonprovisional application claims priority under 35 U.S.C. §119(a) on Patent Application No. 2011-113451 filed in Japan on May 20, 2011, the entire contents of which are hereby incorporated by reference.

BACKGROUND OF THE INVENTION

1. Field of the Invention

The present invention relates to an optical disc device, and relates in particular to an optical disc device for differentiating among different types of optical discs.

2. Description of the Related Art

In recent years, optical discs, namely, compact discs (CDs), digital versatile discs (DVDs), which have greater recording capacity than CDs, and Blu-ray™ discs (BDs), which have greater recording capacity than DVDs, have come to enjoy widespread use.

DVD-compatible optical disc devices are typically configured to also be compatible with CDs, which have less recording capacity than DVDs. Likewise, BD-compatible optical disc devices are typically configured to also be compatible with CDs and DVDs, which have less recording capacity than BDs.

In optical disc devices such as the above, which are compatible with optical discs of several different types, because the setting conditions for playback and recording vary with the different types of optical disc, it is necessary to differentiate the type of an optical disc prior to playing back or recording onto the optical disc.

An optical disc device compatible at a minimum with CDs and DVDs typically differentiates between whether an optical disc is a CD or a DVD by the flow operation shown in FIG. 9.

However, in the case of DVD-RAM, due to the presence of a guard zone and complementary allocated pit addresses (CAPA), when a focus search is performed with a laser diode (LD) that emits an infrared laser in the 780 nm wavelength band (a CD laser), the focus error signal CDLD_FE and the focus sum signal CDLD-FS are extremely small, and the differentiation value A established in Step S20 is not highly accurate. For this reason, there have been cases in which a DVD is erroneously differentiated as a CD, through the determination made in Step S30 or Step S70.

Japanese Laid-open Patent Application 2009-54229, Japanese Patent No. 3890709, and Japanese Laid-open Patent Application 9-106617 disclose techniques for differentiating whether an optical disc is a CD or a DVD. However, in each of these techniques, the accuracy of the differentiation value A is not high, and therefore erroneous differentiation of a DVD as a CD is not prevented.

SUMMARY OF THE INVENTION

It is an objective of the present invention to provide an optical disc device that can prevent erroneous differentiation of a DVD as a CD.

The optical disc device according to the present invention directed to attaining the aforedescribed objective comprises an optical pickup for directing light onto an optical disc, as well as detecting returning light from the optical disc by a photodetector;

a focus error signal generator for processing an electrical signal outputted from the photodetector, and generating a focus error signal;

a focus sum signal generator for processing an electrical signal outputted from the photodetector, and generating a focus sum signal; and a differentiator for differentiating whether the optical disc is a CD or a DVD; and is configured such that, in the event that a differentiation result fails to be confirmed in both a CD confirmation process and a DVD confirmation process, the differentiator performs a final confirmation process; in the CD confirmation process, in a case in which a first differentiation value in accordance with a ratio of a first focus error signal, which is the focus error signal generated by the focus error signal generator when the optical pickup directs a CD laser beam onto the optical disc, to a first focus sum signal, which is the focus sum signal generated by the focus sum signal generator when the optical pickup directs a CD laser beam onto the optical disc, is equal to or greater than a first threshold value, and moreover in which the first focus error signal or the first focus sum signal is equal to or greater than a second threshold value, the differentiator confirms "CD" to be the differentiation result; in the DVD confirmation process, in a case in which a second differentiation value in accordance with a ratio of a second focus error signal, which is the focus error signal generated by the focus error signal generator when the optical pickup directs a DVD laser beam onto the optical disc, to a second focus sum signal, which is the focus sum signal generated by the focus sum signal generator when the optical pickup directs a DVD laser beam onto the optical disc, is equal to or greater than a third threshold value, the differentiator confirms "DVD" to be the differentiation result; and in the final confirmation process, in a case in which the first differentiation value is equal to or greater than the second differentiation value, and moreover in which the first focus error signal is equal to or greater than the second focus error signal, or the first focus sum signal is equal to or greater than the second focus sum signal, the differentiator confirms "CD" to be the differentiation result (a first aspect).

According to this configuration, even when the first differentiation value is equal to or greater than the first threshold value, in the event that the first focus error signal or the first focus sum signal is less than the second threshold value, the differentiator does not confirm "CD" to be the differentiation result; and even when the first differentiation value is equal to or greater than the second differentiation value, in the event that the first focus error signal is less than the second focus error signal, or the first focus sum signal is less than the second focus sum signal, the differentiator does not confirm "CD" to be the differentiation result. Consequently, erroneous differentiation of a DVD-RAM as being a CD when the first focus error signal and first focus sum signal are extremely small can be prevented.

From the standpoint of preventing erroneous differentiation of a CD as being a DVD, in the optical disc device of the aforedescribed first aspect, preferably, in the CD confirmation process, in a case in which the first differentiation value is equal to or greater than the first threshold value, a determination is made as to whether or not the first focus error signal or the first focus sum signal is less than the second threshold value (a second aspect).

From the standpoint of preventing erroneous differentiation of a CD as being a DVD, in the optical disc device of the aforedescribed first or second aspect, preferably, in the final confirmation process, in a case in which the first differentiation value is equal to or greater than the second differentiation value, a determination is made as to whether or not the first focus error signal is less than the second focus error signal, or whether or not the first focus sum signal is less than the second focus sum signal (a third aspect).

In the optical disc device of any of the aforedescribed first to third aspects, in the CD confirmation process, in a case in which the first differentiation value is equal to or greater than the first threshold value, and moreover in which the first focus error signal is equal to or greater than the second threshold value, the differentiator may confirm "CD" to be the differentiation result; and in the final confirmation process, in a case in which the first differentiation value is equal to or greater than the second differentiation value, and moreover in which the first focus error signal is equal to or greater than the second focus error signal, the differentiator may confirm "CD" to be the differentiation result.

DETAILED DESCRIPTION OF PREFERRED EMBODIMENTS

Figure 1:
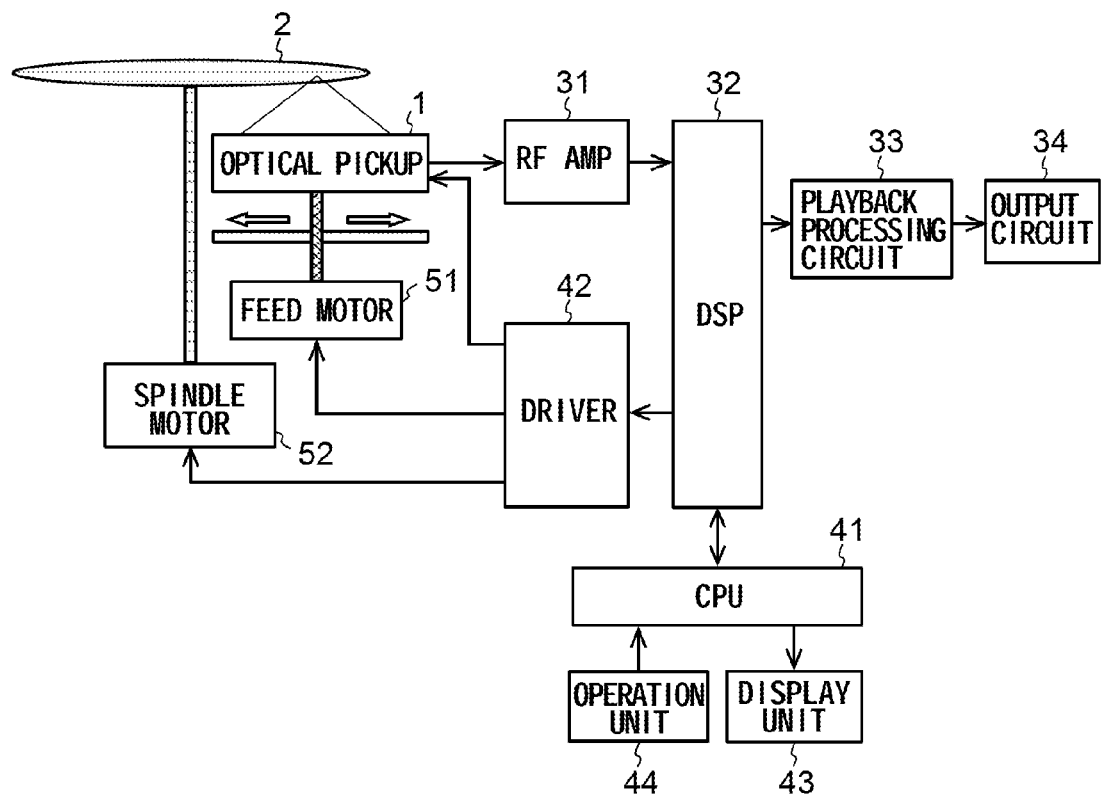
FIG. 1 is a drawing showing a schematic configuration of an optical disc device according to an embodiment of the present invention.

The embodiments of the present invention are described below with reference to the accompanying drawings. A schematic configuration of an optical disc device according to an embodiment of the present invention is shown in FIG. 1.

The optical disc device according to an embodiment of the present invention is an optical disc device compatible with CDs, DVDs, and BDs; and is provided with an optical pickup 1, an RF amp 31, a digital signal processor (DSP) 32, a playback processing circuit 33, an output circuit 34, a central processing unit (CPU) 41, a driver 42, a display unit 43, an operation unit 44, a feed motor 51, and a spindle motor 52. The DSP 32 corresponds to the focus error signal generator, the focus sum signal generator, and the differentiator recited in the claims.

The optical pickup 1 directs a light beam onto an optical disc 2, and reads out information of various types, such as audio information, video information, and the like, which has been recorded onto the optical disc 2. This optical pickup 1 can direct an infrared laser beam of a 780 nm wavelength band (a CD laser beam), a red laser beam of a 650 nm wavelength band (a DVD laser beam), or a blue laser beam of a 405 nm wavelength band (a BD laser beam), onto the optical disc 2. The interior of the optical pickup 1 will be discussed in detail below.

The audio information and video information obtained by the optical pickup 1 is converted to audio and video by the RF amp 31, the DSP 32, the playback processing circuit 33, and the output circuit 34, and outputted respectively to a speaker and a monitor (not shown). The RF amp 31 amplifies the audio signal, the video signal, and the like from the optical pickup 1. The DSP 32 and the playback processing circuit 33 carry out various types of information processing (for example, video processing and the like) for the purpose of playback, on the signals from the RF amp 31. The output circuit 34 performs a D/A conversion process or the like on the signals from the playback processing circuit 33, for the purpose of output to the speaker and monitor (not shown).

The DSP 32 also performs computational processing on the basis of a signal outputted from a photodetector 20 (see FIG. 2), and generates a focus error signal, a tracking error signal, and the like.

The CPU 41 receives information from the operation unit 44 and transfers the information to the DSP 32, as well as transferring information from the DSP 32 to the display unit 43.

On the basis of an instruction from the DSP 32, the driver 42 controls the operation of the feed motor 51 and the spindle motor 52. The feed motor 51 moves the optical pickup 1 in the diametrical direction of the optical disc 2. The spindle motor 52 drives the optical disc 2 in the direction of rotation.

Additionally, on the basis of an instruction from the DSP 32, the driver 42 controls the operation of an actuator 21 and a beam expander (BEX) motor 22 (see FIG. 2) inside the optical pickup 1.

Figures 2, 3:
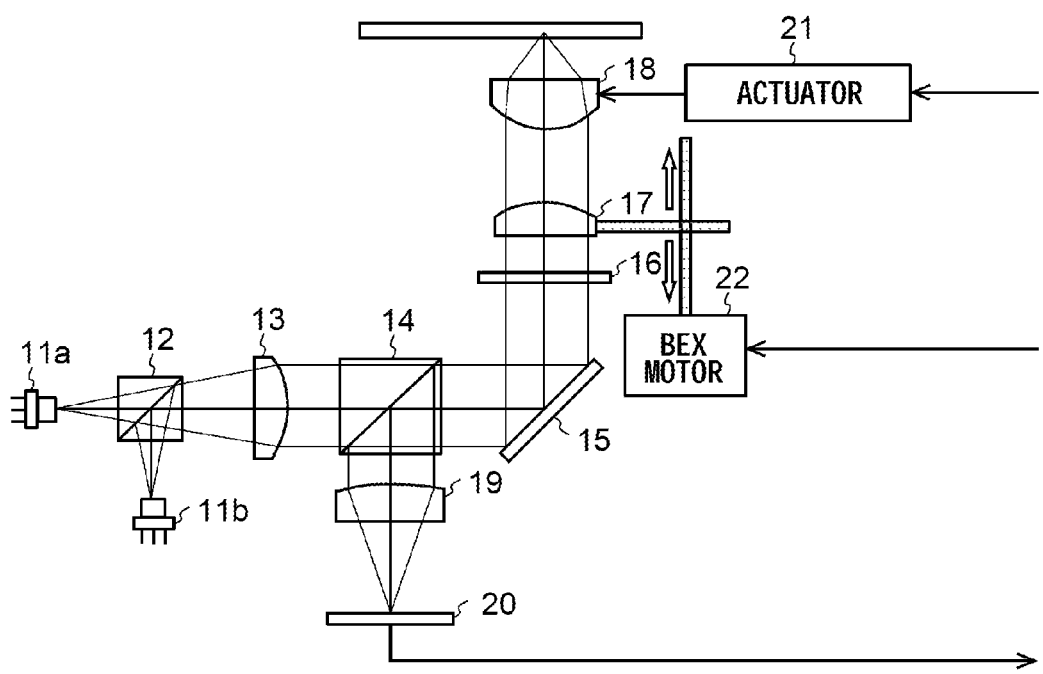
FIG. 2 is a drawing showing a schematic configuration of an optical pickup provided to the optical disc device according to an embodiment of the present invention.
FIG. 3 is a drawing showing an example of a photoreception area of a photodetector.

Next, a schematic configuration of the optical pickup 1 provided to the optical disc device according to an embodiment of the present invention is shown in FIG. 2.

The optical pickup 1 is provided with a first light source 11a, a second light source 11b, a dichroic prism 12, a collimator lens 13, a beam splitter 14, an upright mirror 15, a quarter-wave plate 16, a collimator lens 17, an objective lens 18, a detector lens 19, the photodetector 20, the actuator 21, and the BEX motor 22.

The first light source 11a is a two-wavelength, integrated LD that can emit an infrared laser beam of a 780 nm wavelength band (a CD laser beam), and a red laser beam of a 650 nm wavelength band (a DVD laser beam). The second light source 11b is an LD that can emit a blue laser beam of a 405 nm band (a BD laser beam).

The dichroic prism 12 transmits the laser beam emitted from the first light source 11a, and reflects the laser beam emitted from the second light source 11b. The optical axes of the beams of light emitted from the first light source 11a and the second light source 11b are then made to coincide. The laser beams that are transmitted or reflected in the dichroic prism 12 are sent to the collimator lens 13.

The collimator lens 13 converts the laser beams sent to it from the dichroic prism 12 into parallel light. The laser beams having been converted to parallel light by the collimator lens 13 are sent to the beam splitter 14.

The beam splitter 14 functions as a light splitting element for splitting the impinging laser beams, and transmits the beams of light sent thereto from the collimator lens 13 and guides the beams toward the optical disc 2, and also reflects light reflected from the optical disc 2 and guides the light to the photodetector 20. The laser beams transmitted through the beam splitter 14 are sent to the upright mirror 15.

The upright mirror 15 reflects the beams of light transmitted thereto through the beam splitter 14, and guides the beams toward the optical disc 2. The upright mirror 15 is inclined by 45° with respect to the optical axes of the laser beams sent from the beam splitter 14, making the optical axes of the laser beams reflected from the upright mirror 15 substantially orthogonal to the recording face of the optical disc 2.

The quarter-wave plate 16 has a function for converting linear-polarized light to circular-polarized light, and converting circular-polarized light to linear-polarized light, and is adapted to convert laser beams of linear-polarized light reflected by the upright mirror 15 to circular-polarized light which is sent to the collimator lens 17, and to convert laser beams of circular-polarized light reflected from the optical disc 2 to linear-polarized light which is sent to the upright mirror 15.

The collimator lens 17 is moveable in the direction of the optical axis (the vertical direction in FIG. 2) by the BEX motor 22. Depending on the movement of the collimator lens 17, laser beams emitted from the collimator lens 17 can be brought to a state of diverging light or converging light. Spherical aberration can be corrected by thus modifying the state of the laser beams emitted from the collimator lens 17. The laser beams emitted from the collimator lens 17 are sent to the objective lens 18.

The objective lens 18 focuses the laser beams sent thereto from the collimator lens 17, onto the recording face of the optical disc 2. The objective lens 18 is moveable, for example, in the vertical direction and in the lateral direction in FIG. 2, by the actuator 21, as will be discussed below, and the position thereof is controlled on the basis of a focus servo signal and a tracking servo signal.

The reflected light reflected from the optical disc 2 passes sequentially through the objective lens 18, the collimator lens 17, and the quarter-wave plate 16; reflected by the upright mirror 15; and thereafter further reflected by the beam splitter 14, and focused by the detector lens 19 onto a photoreceptor element furnished on the photodetector 20.

The photodetector 20 employs a photoreceptor element, such as a photodiode or the like, to convert the received optical information into an electrical signal, which is outputted to the DSP 32 (see FIG. 1). The photodetector 20 is provided, for example, with four divided photoreception areas A to D as shown in FIG. 3, and it is possible to perform the photoelectric conversion, and output an electrical signal, separately for each area. In this case, the DSP 32 can generate a focus error signal by subtracting the sum of the electrical signal of area B and the electrical signal of area D from the sum of the electrical signal of area A and the electrical signal of area C, and can generate a focus sum signal from the sum of the electrical signals of areas A to D.

In response to an objective lens drive signal generated and output by the driver 42 (see FIG. 1), the actuator 21 moves the objective lens 18 in the diametrical direction of the optical disc 2.

In addition to a tracking operation to move the objective lens 18 in a direction along the recording face of the optical disc 2, the actuator 21 is also able to perform a tilt operation to incline the objective lens 18 in such a manner as to oscillate the optical axes of the laser beams emitted from the objective lens 18, and a focus operation to move the objective lens 18 closer to or away from the optical disc 2.

The optical disc device according to an embodiment of the present invention configured in the above manner differentiates among different types of optical discs 2 when the optical disc 2 is inserted into the device. Upon differentiation among types of optical discs 2, differentiation between a BD disc and a non-BD disc is performed first. In the event of differentiation of a non-BD disc, the optical disc device according to an embodiment of the present invention initiates the flow operation shown in FIG. 4, in order to differentiate between a DVD and a CD.

Figure 4:
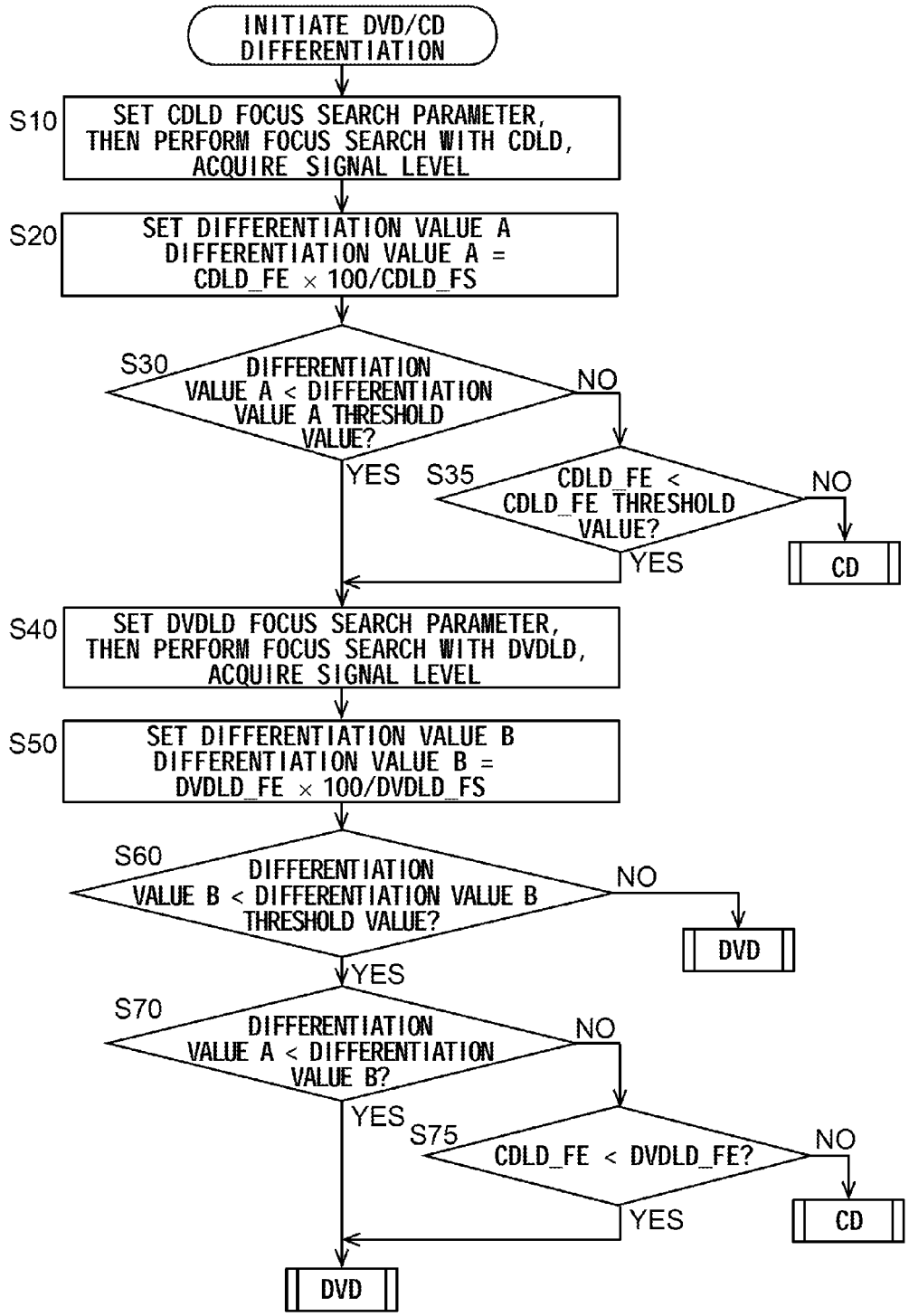
FIG. 4 is a flowchart for execution by the optical disc device according to an embodiment of the present invention, in order to differentiate between a DVD and a CD.

Once the flow operation shown in FIG. 4 has been initiated, the DSP 32 establishes a focus search parameter that is suitable for a case of emission of a CD laser beam by the first light source 11a (a CDLD focus search parameter), then performs a focus search with the CD laser beam, and acquires the level of the electrical signals output from the photodetector 20 (Step S10).

In Step S20 which follows Step S10, the DSP 32 generates a focus error signal CDLD_FE obtained with the CD laser beam and a focus sum signal CDLD_FS obtained with the CD laser beam, and thereafter sets a differentiation value A represented by the following Expression (1) (Step S20).

$$\text{Differentiation value } A = CDLD\_FE \times 100 / CDLD\_FS \quad (1)$$

In Step S30 which follows Step S20, the DSP 32 determines whether or not the differentiation value A is less than a threshold value for the differentiation value A. The threshold value for the differentiation value A may be saved in advance in nonvolatile memory built into the DSP 32, for example.

In the event that the differentiation value A is less than the threshold value for the differentiation value A (YES in Step S30), the DSP 32 immediately proceeds to Step S40. On the other hand, in the event that the differentiation value A is not less than the threshold value for the differentiation value A (NO in Step S30), the DSP 32 then determines whether or not the focus error signal CDLD_FE obtained with the CD laser beam is less than a CDLD_FE threshold value (Step S35). The CDLD_FE threshold value may be saved in advance in nonvolatile memory built into the DSP 32, for example.

In the event that the focus error signal CDLD_FE obtained with the CD laser beam is not less than the CDLD_FE threshold value (NO in Step S35), the DSP 32 confirms "CD" to be the differentiation result, and terminates the flow operation. On the other hand, in the event that the focus error signal CDLD_FE obtained with the CD laser beam is less than the CDLD_FE threshold value (YES in Step S35), there is a possibility that the optical disc 2 is a DVD-RAM, and therefore the DSP 32 proceeds to Step S40, without confirming "CD" to be the differentiation result.

In Step S40, the DSP 32 establishes a focus search parameter suitable in cases of emission of a DVD laser beam by the first light source 11a (a DVDLD focus search parameter), and thereafter performs a focus search with the DVD laser beam, and acquires the level of the electrical signals output from the photodetector 20 (Step S40).

In Step S50 which follows Step S40, the DSP 32 generates a focus error signal DVDLD_FE obtained with the DVD laser beam and a focus sum signal DVDLD_FS obtained with the DVD laser beam, and thereafter sets a differentiation value B represented by the following Expression (2) (Step S50).

$$\text{Differentiation value } B = DVDLD\_FE \times 100 / DVDLD\_FS \quad (2)$$

In Step S60 which follows Step S50, the DSP 32 determines whether or not the differentiation value B is less than a threshold value for the differentiation value B. The threshold value for the differentiation value B may be saved in advance in nonvolatile memory built into the DSP 32, for example.

In the event that the differentiation value B is less than the threshold value for the differentiation value B (YES in Step S60), the DSP 32 proceeds to Step S70. On the other hand, in the event that the differentiation value B is not less than the threshold value for the differentiation value B (NO in Step S60), the DSP 32 confirms "DVD" to be the differentiation result, and terminates the flow operation.

In Step S70, the DSP 32 determines whether or not the differentiation value A is less than the differentiation value B. In the event that the differentiation value A is less than the differentiation value B (YES in Step S70), the DSP 32 confirms "DVD" to be the differentiation result, and terminates the flow operation. On the other hand, in the event that the differentiation value A is not less than the differentiation value B (NO in Step S70), the DSP 32 determines whether or not the focus error signal CDLD_FE obtained with the CD laser beam is less than the focus error signal DVDLD_FE obtained with the DVD laser beam (Step S75).

In the event that the focus error signal CDLD_FE obtained with the CD laser beam is less than the focus error signal DVDLD_FE obtained with the DVD laser beam (YES in Step S75), the DSP 32 confirms "DVD" to be the differentiation result, and terminates the flow operation. On the other hand, in the event that the focus error signal CDLD_FE obtained with the CD laser beam is not less than the focus error signal DVDLD_FE obtained with the DVD laser beam (NO in Step S75), the DSP 32 confirms "CD" to be the differentiation result, and terminates the flow operation.

Through operation as discussed above, even when the differentiation value A is equal to or greater than the threshold value for the differentiation value A, as long as the focus error signal CDLD_FE obtained with the CD laser beam is smaller than the CDLD_FE threshold value, "CD" is not confirmed to be the differentiation result; and even when the differentiation value A is equal to or greater than the differentiation value B, as long as the focus error signal CDLD_FE obtained with the CD laser beam is smaller than the focus error signal DVDLD_FE obtained with the DVD laser beam, "CD" is not confirmed to be the differentiation result. Consequently, erroneous differentiation of a DVD-RAM as being a CD where the focus error signal CDLD_FE and focus sum signal CDLD_FS obtained with the CD laser beam are extremely small can be prevented.

Figure 5:
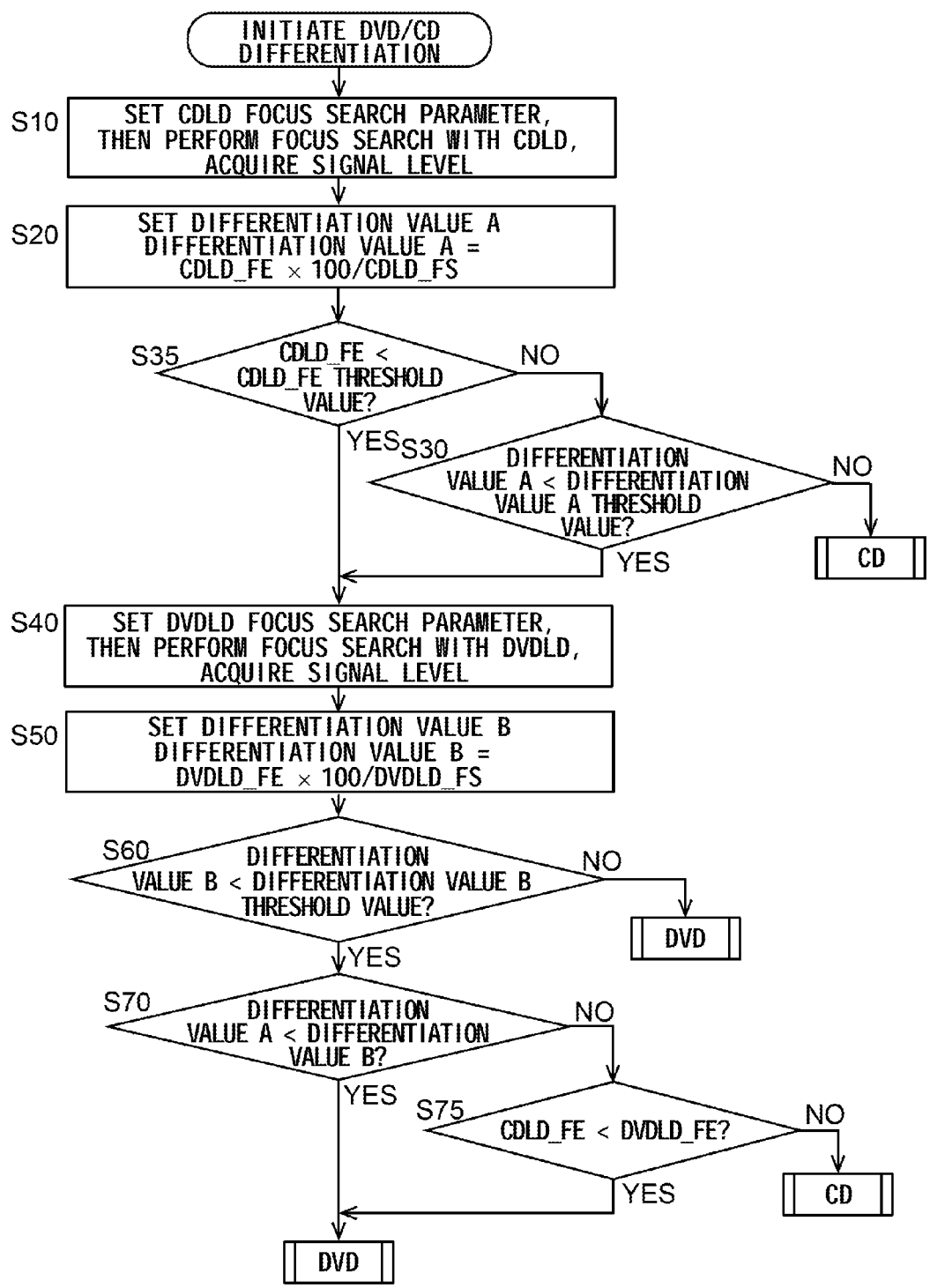
FIG. 5 is another flowchart for execution by the optical disc device according to an embodiment of the present invention, in order to differentiate between a DVD and a CD.

The optical disc device according to an embodiment of the present invention may execute the flow operation shown in FIG. 5, in place of the flow operation shown in FIG. 4. The flowchart of FIG. 5 has a configuration where the sequence of Step S30 and Step S35 in the flowchart of FIG. 4 has been switched.

Figure 6:
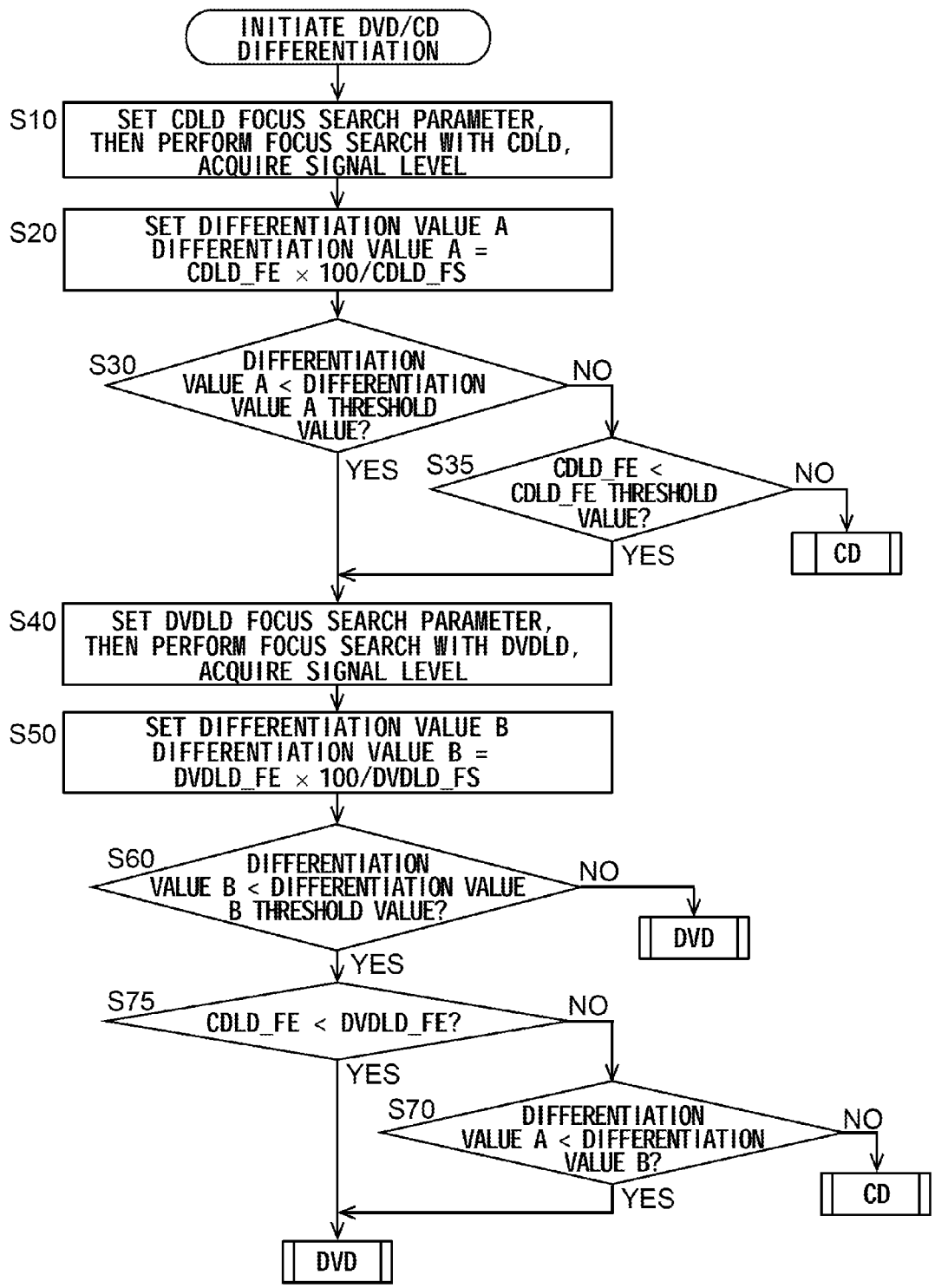
FIG. 6 is yet another flowchart for execution by the optical disc device according to an embodiment of the present invention, in order to differentiate between a DVD and a CD.

The optical disc device according to an embodiment of the present invention may execute the flow operation shown in FIG. 6, in place of the flow operation shown in FIG. 4. The flowchart of FIG. 6 has a configuration where the sequence of Step S70 and Step S75 in the flowchart of FIG. 4 has been switched.

Figure 7:
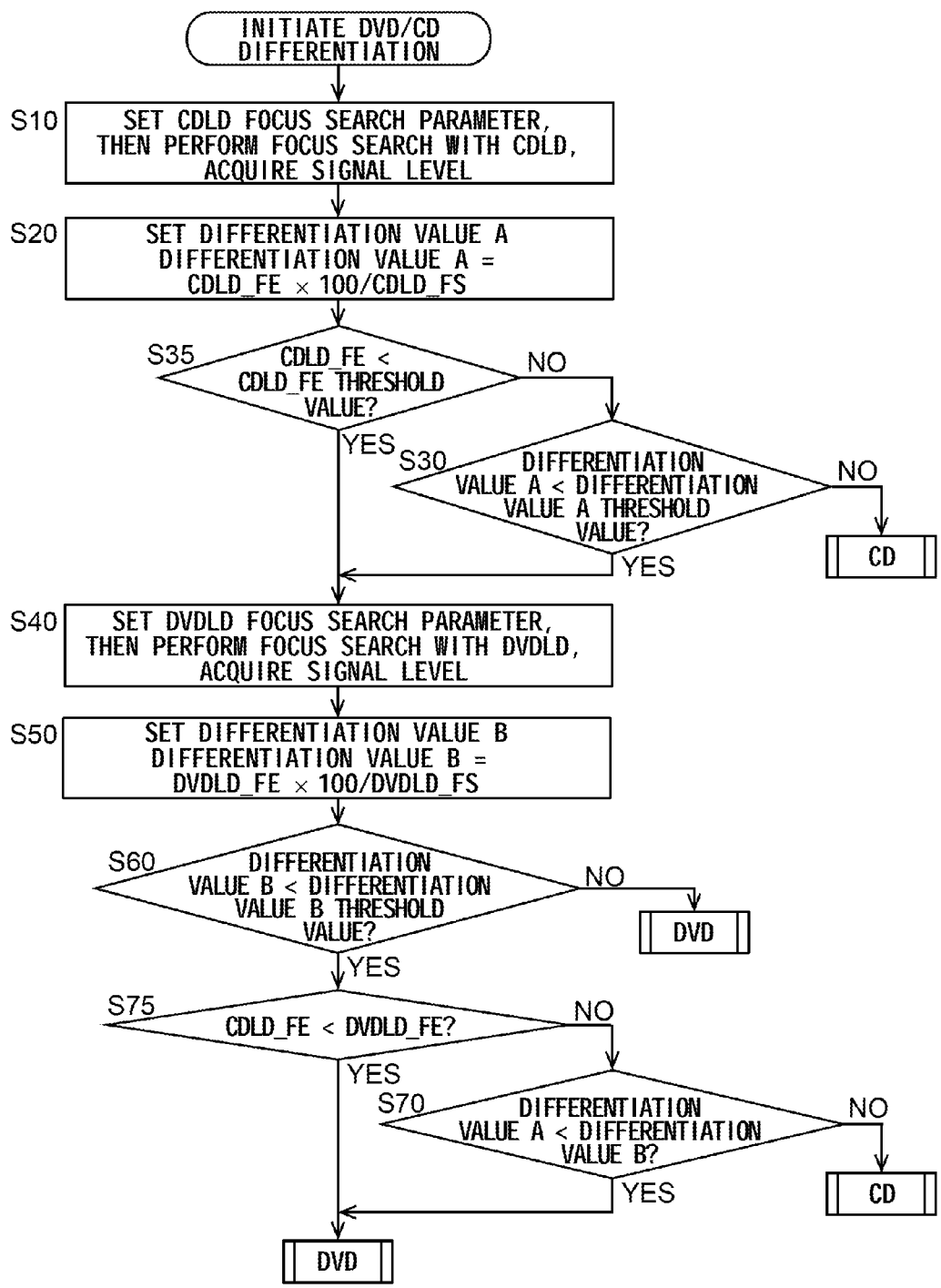
FIG. 7 is yet another flowchart for execution by the optical disc device according to an embodiment of the present invention, in order to differentiate between a DVD and a CD.

The optical disc device according to an embodiment of the present invention may execute the flow operation shown in FIG. 7, in place of the flow operation shown in FIG. 4. The flowchart of FIG. 7 has a configuration where the sequence of Step S30 and Step S35 in the flowchart of FIG. 4 has been switched, and where the sequence of Step S70 and Step S75 has been switched. However, in the flow operation of FIG. 7, in a case in which the differentiation value B is less than the threshold value for the differentiation value B, "DVD" is confirmed to be the differentiation result, without there having been made a determination employing the differentiation value A, and therefore there is a risk of erroneous differentiation of a CD as being a DVD. For this reason, the flow operation shown in FIG. 4 to FIG. 6 is preferred over the flow operation shown in FIG. 7. Because the adverse effects of erroneous differentiation of a CD as being a DVD are less than those of erroneous differentiation of a DVD as being a CD, the flow operation shown in FIG. 7 is advantageous as well.

Figure 8:
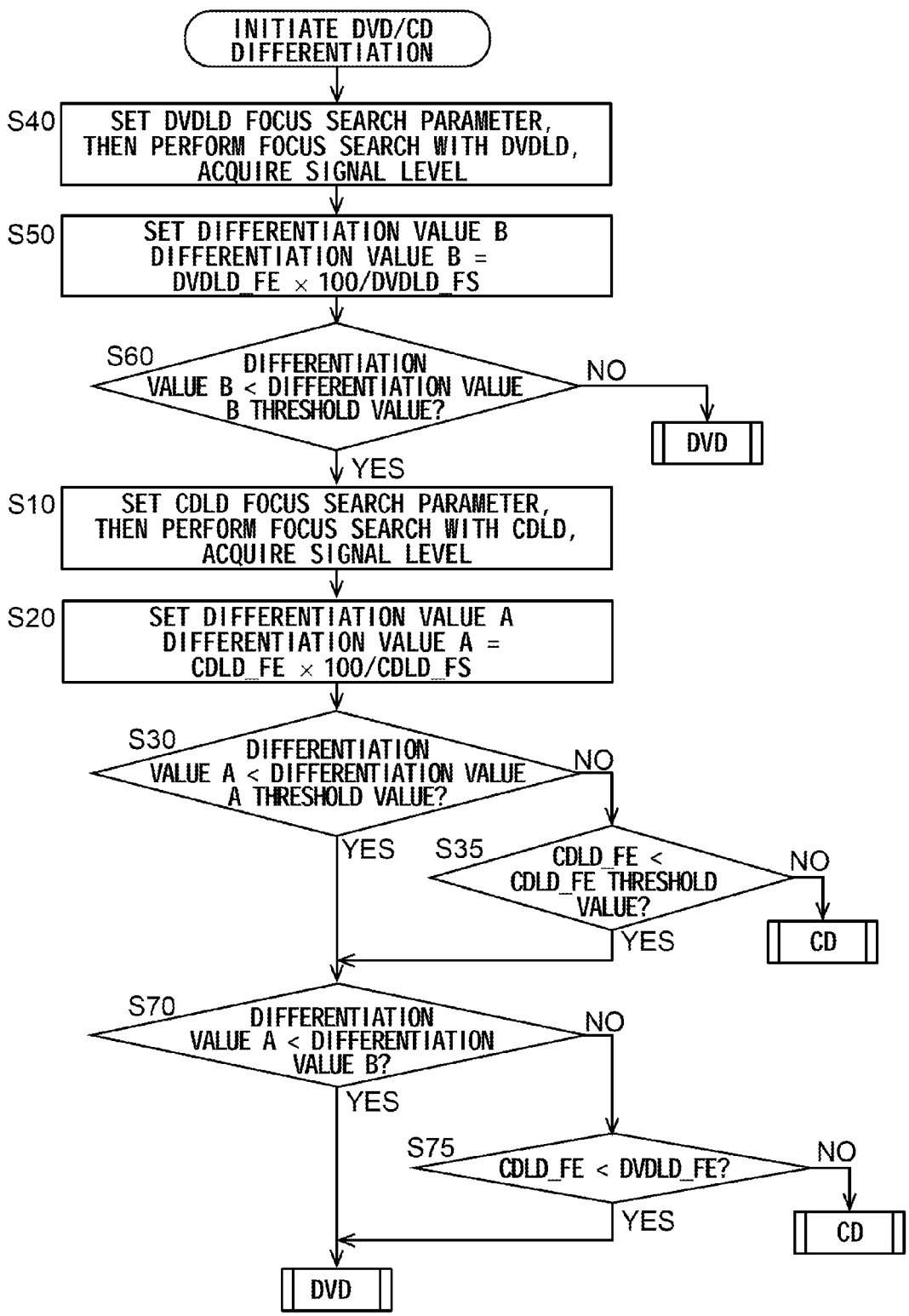
FIG. 8 is yet another flowchart for execution by the optical disc device according to an embodiment of the present invention, in order to differentiate between a DVD and a CD.
Figure 9:
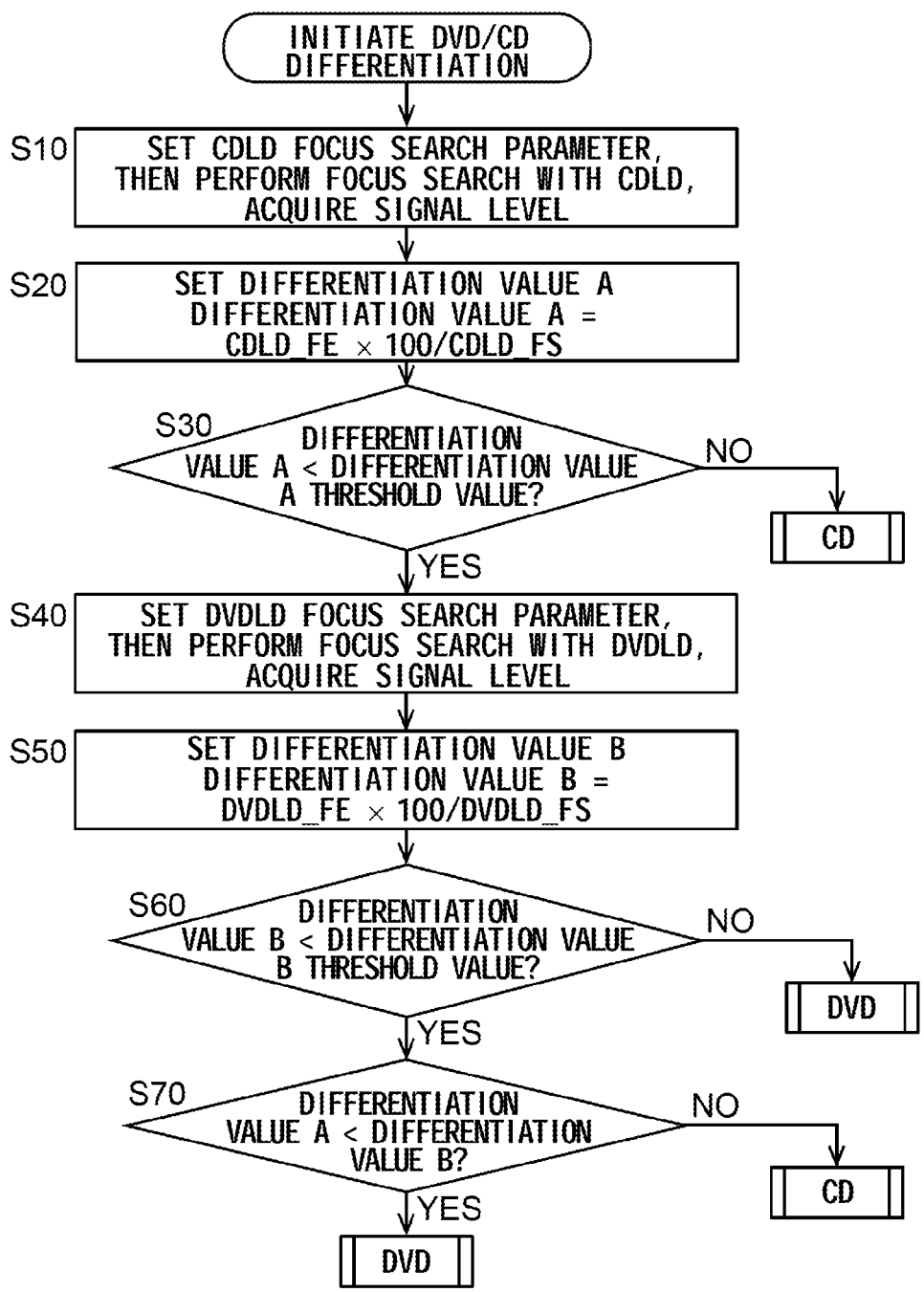
FIG. 9 is a flowchart typically executed by an optical disc device, in order to differentiate between a DVD and a CD.

The optical disc device according to an embodiment of the present invention may execute the flow operation shown in FIG. 8, in place of the flow operation shown in FIG. 4. The flowchart of FIG. 8 has a configuration where the sequences of Steps S10 to S35 and of Steps S40 to S60 in the flowchart of FIG. 4 have been switched. It is possible for modifications comparable to the modification from the flowchart of FIG. 4 to the flowchart of FIG. 8 to be performed on the flowcharts of FIGS. 5 to 7 as well.

Furthermore, it is possible as well to perform modifications of the flowcharts discussed above, to change Step S35 to a step of determining whether the focus sum signal CDLD_FS obtained with the CD laser beam is smaller than the CDLD_FS threshold value, and/or to change Step S75 to a step of determining whether the focus sum signal CDLD_FS obtained with the CD laser beam is smaller than the focus sum signal DVDLD_FS obtained with the DVD laser beam. The CDLD_FS threshold value may be saved in advance in non-volatile memory built into the DSP 32, for example.

What is claimed is:
1. An optical disc device, comprising:
an optical pickup for directing light onto an optical disc, as well as detecting returning light from the optical disc by a photodetector;
a focus error signal generator for processing an electrical signal outputted from the photodetector and generating a focus error signal;
a focus sum signal generator for processing an electrical signal outputted from the photodetector and generating a focus sum signal; and
a differentiator for differentiating whether the optical disc is a CD or a DVD; and
wherein, in the event that a differentiation result fails to be confirmed in both a CD confirmation process and a DVD confirmation process, the differentiator performs a final confirmation process;
and wherein, in the CD confirmation process,
in a case in which a first differentiation value in accordance with a ratio of a first focus error signal, which is a focus error signal generated by the focus error signal generator when the optical pickup directs a CD laser beam onto the optical disc, to a first focus sum signal which is a focus sum signal generated by the focus sum signal generator when the optical pickup directs a CD laser beam onto the optical disc, is equal to or greater than a first threshold value, and moreover in which the first focus error signal or the first focus sum signal is equal to or greater than a second threshold value, the differentiator confirms "CD" to be the differentiation result;
in the DVD confirmation process,
in a case in which a second differentiation value in accordance with a ratio of a second focus error signal, which is a focus error signal generated by the focus error signal generator when the optical pickup directs a DVD laser beam onto the optical disc, to a second focus sum signal which is a focus sum signal generated by the focus sum signal generator when the optical pickup directs a DVD laser beam onto the optical disc, is equal to or greater than a third threshold value, the differentiator confirms "DVD" to be the differentiation result; and
in the final confirmation process,
in a case in which the first differentiation value is equal to or greater than the second differentiation value, and moreover in which the first focus error signal is equal to or greater than the second focus error signal, or the first focus sum signal is equal to or greater than the second focus sum signal, the differentiator confirms "CD" to be the differentiation result.

2. The optical disc device of claim 1, wherein
in the CD confirmation process,
in a case in which the first differentiation value is equal to or greater than the first threshold value, a determination is made as to whether or not the first focus error signal or the first focus sum signal is less than the second threshold value.

3. The optical disc device of claim 1, wherein
in the final confirmation process,
in a case in which the first differentiation value is equal to or greater than the second differentiation value, a determination is made as to whether or not the first focus error signal is less than the second focus error signal, or as to whether or not the first focus sum signal is less than the second focus sum signal.

4. The optical disc device of claim 2, wherein
in the final confirmation process,
in a case in which the first differentiation value is equal to or greater than the second differentiation value, a determination is made as to whether or not the first focus error signal is less than the second focus error signal, or as to whether or not the first focus sum signal is less than the second focus sum signal.

5. The optical disc device of claim 1, wherein
in the CD confirmation process,
in a case in which the first differentiation value is equal to or greater than the first threshold value, and moreover in which the first focus error signal is equal to or greater than the second threshold value, the differentiator confirms "CD" to be the differentiation result; and
in the final confirmation process,
in a case in which the first differentiation value is equal to or greater than the second differentiation value, and moreover the first focus error signal is equal to or greater than the second focus error signal, the differentiator confirms "CD" to be the differentiation result.

6. The optical disc device of claim 2, wherein
in the CD confirmation process,
in a case in which the first differentiation value is equal to or greater than the first threshold value, and moreover in which the first focus error signal is equal to or greater than the second threshold value, the differentiator confirms "CD" to be the differentiation result; and
in the final confirmation process,
in a case in which the first differentiation value is equal to or greater than the second differentiation value, and moreover in which the first focus error signal is equal to or greater than the second focus error signal, the differentiator confirms "CD" to be the differentiation result.

7. The optical disc device of claim 3, wherein
in the CD confirmation process,
in a case in which the first differentiation value is equal to or greater than the first threshold value, and moreover in which the first focus error signal is equal to or greater than the second threshold value, the differentiator confirms "CD" to be the differentiation result; and
in the final confirmation process,
in a case in which the first differentiation value is equal to or greater than the second differentiation value, and moreover in which the first focus error signal is equal to or greater than the second focus error signal, the differentiator confirms "CD" to be the differentiation result.

8. The optical disc device of claim 4, wherein
in the CD confirmation process,
in a case in which the first differentiation value is equal to or greater than the first threshold value, and moreover in which the first focus error signal is equal to or greater than the second threshold value, the differentiator confirms "CD" to be the differentiation result; and
in the final confirmation process,
in a case in which the first differentiation value is equal to or greater than the second differentiation value, and moreover in which the first focus error signal is equal to or greater than the second focus error signal, the differentiator confirms "CD" to be the differentiation result.

* * * * *